United States Patent
Atanassov et al.

(10) Patent No.: US 9,883,119 B1
(45) Date of Patent: Jan. 30, 2018

(54) METHOD AND SYSTEM FOR HARDWARE-BASED MOTION SENSITIVE HDR IMAGE PROCESSING

(71) Applicant: QUALCOMM Incorporated, San Diego, CA (US)

(72) Inventors: Kalin Mitkov Atanassov, San Diego, CA (US); Sergiu Radu Goma, San Diego, CA (US); Stephen Michael Verrall, San Diego, CA (US); Albrecht Johannes Lindner, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/273,556

(22) Filed: Sep. 22, 2016

(51) Int. Cl.
| | |
|---|---|
| *H04N 5/225* | (2006.01) |
| *H04N 5/265* | (2006.01) |
| *G06T 7/20* | (2017.01) |
| *G06T 7/40* | (2017.01) |
| *G06T 7/00* | (2017.01) |
| *H04N 5/232* | (2006.01) |
| *H04N 5/228* | (2006.01) |

(52) U.S. Cl.
CPC ........... *H04N 5/265* (2013.01); *G06T 7/0022* (2013.01); *G06T 7/2006* (2013.01); *G06T 7/408* (2013.01); *H04N 5/23293* (2013.01)

(58) Field of Classification Search
CPC .......... H04N 5/23251; H04N 5/23264; H04N 5/23267; H04N 5/23232; H04N 5/2355
See application file for complete search history.

(56) References Cited

U.S. PATENT DOCUMENTS

| | | | | |
|---|---|---|---|---|
| 8,542,315 | B2 * | 9/2013 | Sorek ................. | H04N 5/35554 348/231.99 |
| 2003/0098919 | A1 * | 5/2003 | Liu ..................... | H04N 5/23248 348/297 |
| 2007/0242900 | A1 * | 10/2007 | Chen ........................ | G06T 5/50 382/294 |
| 2011/0058050 | A1 | 3/2011 | Lasang et al. | |
| 2011/0211732 | A1 | 9/2011 | Rapaport | |

(Continued)

FOREIGN PATENT DOCUMENTS

JP          2002101347 A        4/2002

OTHER PUBLICATIONS

International Search Report and Written Opinion—PCT/US2017/043737—ISA/EPO—dated Oct. 9, 2017.

*Primary Examiner* — Kelly L Jerabek
(74) *Attorney, Agent, or Firm* — Knobbe, Martens, Olson & Bear, LLP

(57) ABSTRACT

System and methods for performing motion sensitive high dynamic range (HDR) image processing. A saturation analysis circuit is configured to receive a set of image data corresponding to portions of a set of image frames having different exposures time from a lowest exposure time to a highest exposure time, and select image data from a frame that does not exceed the saturation threshold value. A motion detection circuit may be configured to determine whether the image data is associated with movement, by comparing image data from pairs of frames of adjacent exposure times, and changing the selection to a lower exposure time frame if movement is detected. By selecting which exposure time is used based upon movement in the image frame, ghosting and blurring in HDR images containing movement can be reduced.

20 Claims, 11 Drawing Sheets

(56) References Cited

U.S. PATENT DOCUMENTS

| | | | |
|---|---|---|---|
| 2012/0288217 A1* | 11/2012 | Zhai | G06T 5/50 |
| | | | 382/294 |
| 2013/0028509 A1 | 1/2013 | Moon et al. | |
| 2014/0307110 A1* | 10/2014 | Liu | H04N 5/23267 |
| | | | 348/208.1 |
| 2014/0307960 A1 | 10/2014 | Sharma et al. | |
| 2015/0002704 A1 | 1/2015 | Vidal-Naquet | |
| 2015/0092075 A1* | 4/2015 | Kim | H04N 5/2355 |
| | | | 348/222.1 |
| 2017/0195596 A1* | 7/2017 | Vogelsang | H04N 5/35581 |

* cited by examiner

METHOD AND SYSTEM FOR HARDWARE-BASED MOTION SENSITIVE HDR IMAGE PROCESSING

FIELD

This disclosure generally relates to image processing, and more particularly to High Dynamic Range (HDR) image processing.

BACKGROUND

HDR imaging is a technique used in imaging and photography to reproduce a greater dynamic range of luminosity than would be otherwise possible with standard imaging techniques. This is because standard imaging sensors often are only able to capture a narrow range of pixel intensities. When capturing images with uneven lighting (e.g., scenes containing direct sunlight and dark shadows), existing image sensors are unable to capture the entire spectrum of luminosity, resulting in loss of detail in highlights or shadow.

HDR techniques may involve capturing multiple images using different exposure times, in order to produce a set of images having different luminosity ranges. The images may then be combined in order to produce a single image having a greater luminosity range than. However, scenes containing moving objects may present difficulties. Due to the objects appearing in different locations in each of the captured images due to the different amounts of exposure, the combining of the captured images may often result in ghosting or blurring. Mitigating ghosting and blurring is often a computationally expensive process, and are difficult to implement in applications requiring high throughput and/or single path functionality, such as video capture.

SUMMARY

The systems, methods and devices of this disclosure each have several innovative aspects, no single one of which is solely responsible for the desirable attributes disclosed herein.

In some embodiments, a system for performing high dynamic range (HDR) image processing is provided. The system may comprise a saturation analysis circuit configured to receive a set of image data corresponding to portions of a set of image frames, each image data of the set associated with a different exposure time from a lowest exposure time to a highest exposure time. The saturation analysis circuit may be further configured to perform saturation analysis on the received set of image data. The saturation analysis may comprise, for each of at least a portion of the set of image data, determining whether the image data exceeds a saturation threshold value. The saturation analysis may further comprise determining a selection, wherein the selection specifies an image data of the set of image data that does not exceed the saturation threshold value. The system may further comprise a motion detection circuit configured to determine whether the set of image data is associated with movement. The determination may comprise identifying one or more pairs of image data associated with adjacent pairs of exposure times. The determination may further comprise determining a difference factor for at least one pair of image data. The determination may further comprise comparing the determined difference factor with a difference threshold, wherein the set of image data is associated with movement in response to the determined difference factor exceeding the difference threshold. The determination may further comprise changing the selection of the saturation analysis circuit in response to a determination that the set of image data is associated with movement. The system may further comprise an image combiner circuit configured to select an image data for constructing an HDR output image, based upon the selection.

In some embodiments, a method for performing high dynamic range (HDR) image processing is provided. The method comprises receiving a set of image data corresponding to portions of a set of image frames, each image data of the set associated with a different exposure time from a lowest exposure time to a highest exposure time. The method may further comprise performing saturation analysis on the received set of image data. The saturation analysis may comprise, for each of at least a portion of the set of image data, determining whether the image data exceeds a saturation threshold value. The saturation analysis may further comprise determining a selection, wherein the selection specifies an image data of the set of image data that does not exceed the saturation threshold value. The method may further comprise performing motion detection. The motion detection may comprise identifying one or more pairs of image data associated with adjacent pairs of exposure times. The motion detection may further comprise determining a difference factor for at least one pair of image data. The motion detection may further comprise comparing the determined difference factor with a difference threshold, wherein the set of image data is associated with movement in response to the determined difference factor exceeding the difference threshold. The motion detection may further comprise changing the selection of the saturation analysis circuit in response to a determination that the set of image data is associated with movement. The method may further comprise selecting an image data for constructing an HDR output image, based upon the selection.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Further, the systems and methods described herein may be implemented on a variety of different computing devices that host a camera. These include mobile phones, tablets, dedicated cameras, portable computers, photo booths or kiosks, personal digital assistants, ultra-mobile personal computers, mobile internet devices, security cameras, action cameras, drone cameras, automotive cameras, body cameras, head mounted cameras, etc. They may use general purpose or special purpose computing system environments or configurations. Examples of computing systems, environments, and/or configurations that may be suitable for use with the described technology include, but are not limited to, personal computers (PCs), server computers, hand-held or laptop devices, multiprocessor systems, microprocessor-based systems, programmable consumer electronics, network PCs, minicomputers, mainframe computers, distributed computing environments that include any of the above systems or devices, and the like.

Camera System

Figure 1:
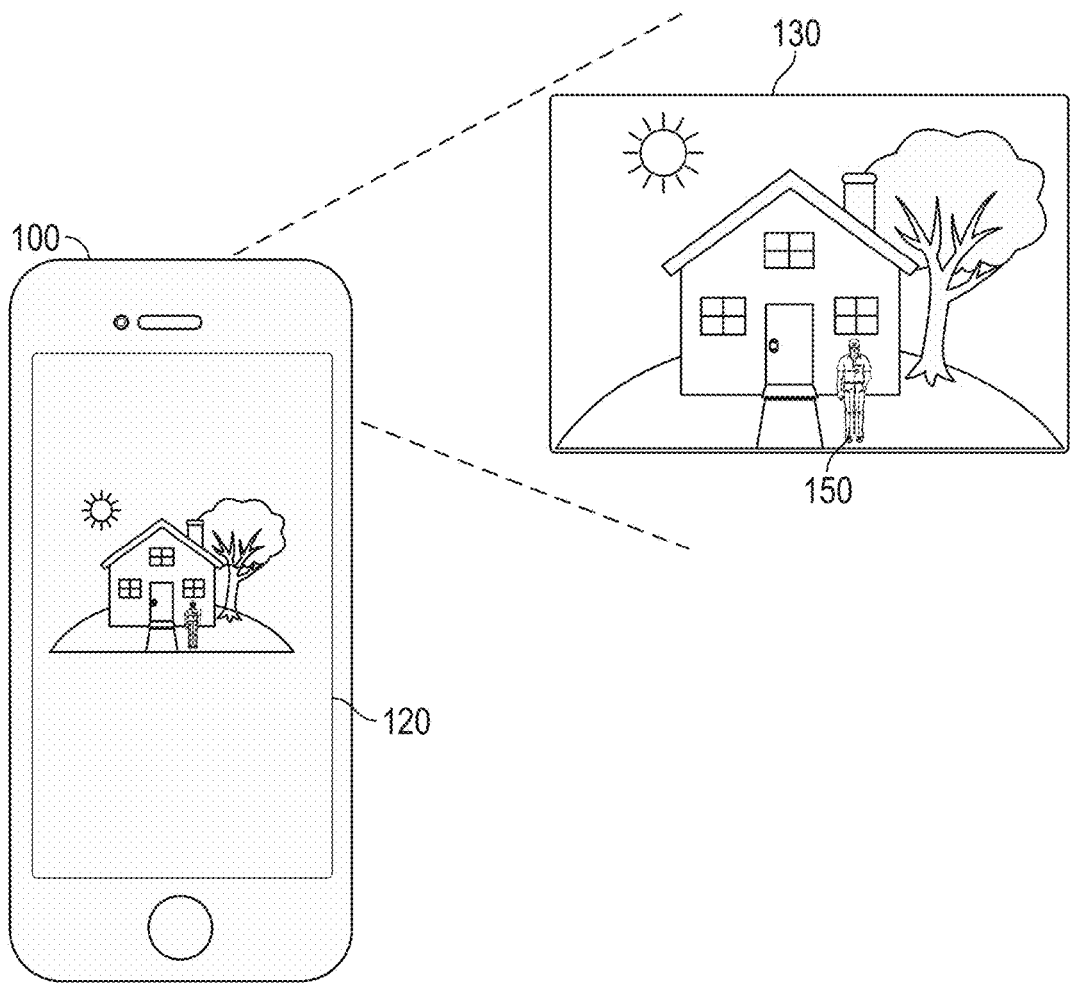
FIG. 1 illustrates an example of an apparatus (e.g., a mobile communication device) that includes an imaging system that can record images of a scene in accordance with aspects of this disclosure.

FIG. 1 illustrates an example of an apparatus (e.g., a mobile communication device) that includes an imaging system that can record images of a scene in accordance with aspects of this disclosure. The apparatus 100 includes a display 120. The apparatus 100 may also include a camera on the reverse side of the apparatus, which is not shown. The display 120 may display images captured within the field of view 130 of the camera. FIG. 1 shows an object 150 (e.g., a person) within the field of view 130 which may be captured by the camera. A processor within the apparatus 100 may perform various functions relating to the imaging device, which may include image capture functions (e.g., auto-focus), image processing functions (e.g., saturation analysis, motion detection, and/or the like), etc. The apparatus 100 may comprise an imaging device or component as part of a system-on-chip (SoC). The SoC may include a central processing unit (CPU) that uses at least one RISC instruction set, and a single SoC may include multiple CPU cores, a graphics processing unit (GPU), a wireless modem, and other software and hardware to support a smartphone's global positioning system (GPS), camera, gesture recognition and video.

Figure 2:
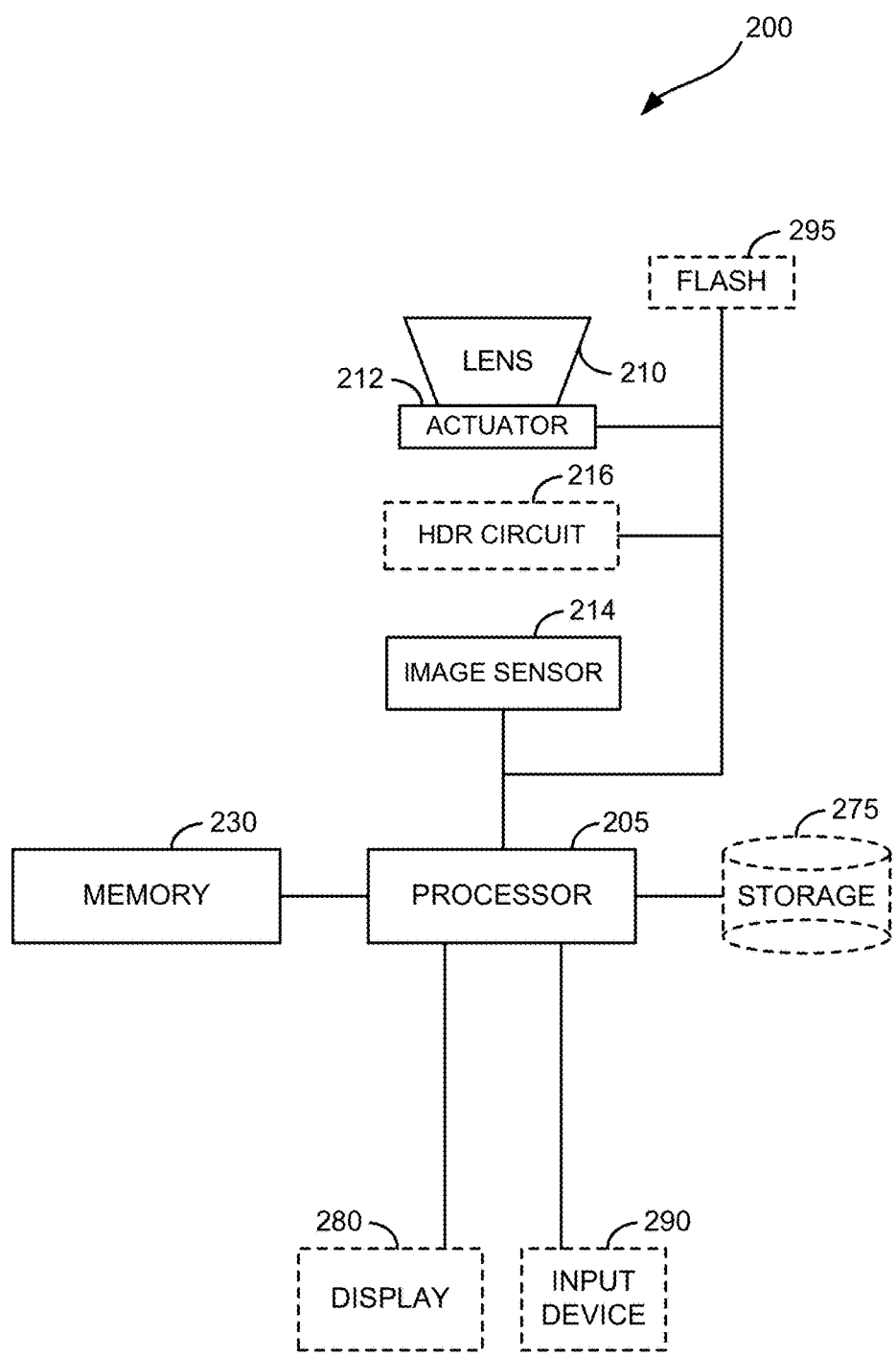
FIG. 2 depicts a block diagram illustrating an example of an imaging device in accordance with aspects of this disclosure.

FIG. 2 depicts a block diagram illustrating an example of an imaging device in accordance with aspects of this disclosure. The imaging device 200, also referred herein to interchangeably as a camera, may include a processor 205 operatively connected to an image sensor 214, an HDR imaging integrated circuit (IC) 216, a lens 210, an actuator 212, a memory 230, an optional storage 275, an optional display 280, an optional input device 290, and an optional flash 295. In this example, the illustrated memory 230 may store instructions to configure processor 205 to perform functions relating to the imaging device 200, such as performing HDR image processing.

In an illustrative embodiment, light enters the lens 210 and is focused on the image sensor 214. In some embodiments, the lens 210 is part of a system which can include multiple lenses and adjustable optical elements and may be controllable by the processor 205. In one aspect, the image sensor 214 utilizes a charge coupled device (CCD). In another aspect, the image sensor 214 utilizes either a complementary metal-oxide semiconductor (CMOS) or CCD sensor. The lens 210 is coupled to the actuator 212 and may be moved by the actuator 212 relative to the image sensor 214. The movement of the lens 210 with respect to the image sensor 214 may be used to focus captured image. For example, the actuator 212 may be configured to move the lens 210 in a series of one or more lens movements to adjust the lens position to change the focus of an image.

The display 280 may be configured to display images captured via the lens 210 and the image sensor 214 and may also be utilized to implement configuration functions of the imaging device 200. In one implementation, the display 280 may be configured to display one or more regions of a captured image selected by a user, via an input device 290, of the imaging device 200. In some embodiments, the imaging device 200 may not include the display 280.

The input device 290 may take on many forms depending on the implementation. In some implementations, the input device 290 may be integrated with the display 280 so as to form a touch screen display. In other implementations, the input device 290 may include separate keys or buttons on the imaging device 200. These keys or buttons may provide input for navigation of a menu that is displayed on the display 280. In other implementations, the input device 290 may be an input port. For example, the input device 290 may provide for operative coupling of another device to the imaging device 200. The imaging device 200 may then receive input from an attached keyboard or mouse via the input device 290. In still other embodiments, the input device 290 may be remote from and communicate with the imaging device 200 over a communication network, e.g., a wireless network.

In some embodiments, the HDR imaging IC 216 may be used to perform HDR imaging on one or more captured images (e.g., captured by image sensor 214). For example, the HDR imaging IC 216 may receive image data from multiple frames corresponding to the same scene but taken with different exposure levels. The image data from the different frames may be compared to determine whether there is motion in the corresponding area of the frame, and to construct a composite HDR image using the pixels of the different frames. The structure and operation of HDR imaging IC 216 will be described in greater detail below in association with FIGS. 3-10. In some embodiments, one or more HDR functions may be performed by processor 205 instead of by HDR imaging IC 216, or by a combination of HDR imaging IC 216 and processor 205.

The memory 230 may be utilized by the processor 205 to store data dynamically created during operation of the imaging device 200. In some instances, the memory 230 may include a separate working memory in which to store the dynamically created data. For example, instructions stored in the memory 230 may be stored in the working memory when executed by the processor 205. The working memory may also store dynamic run time data, such as stack or heap data utilized by programs executing on processor 205. The storage 275 may be utilized to store data created by the imaging device 200. For example, images captured via image sensor 214 may be stored on storage 275. Like the input device 290, the storage 275 may also be located remotely, i.e., not integral with the imaging device 200, and may receive captured images via the communication network.

The memory 230 may be considered a computer readable medium and stores instructions for instructing the processor 205 and/or HDR imaging IC 216 to perform various functions in accordance with this disclosure. For example, in some aspects, memory 230 may be configured to store instructions that cause the processor 205 and/or HDR imaging IC 216 to perform various methods, such as those as described below and as illustrated in FIGS. 3-10.

HDR Processing

Figure 3:
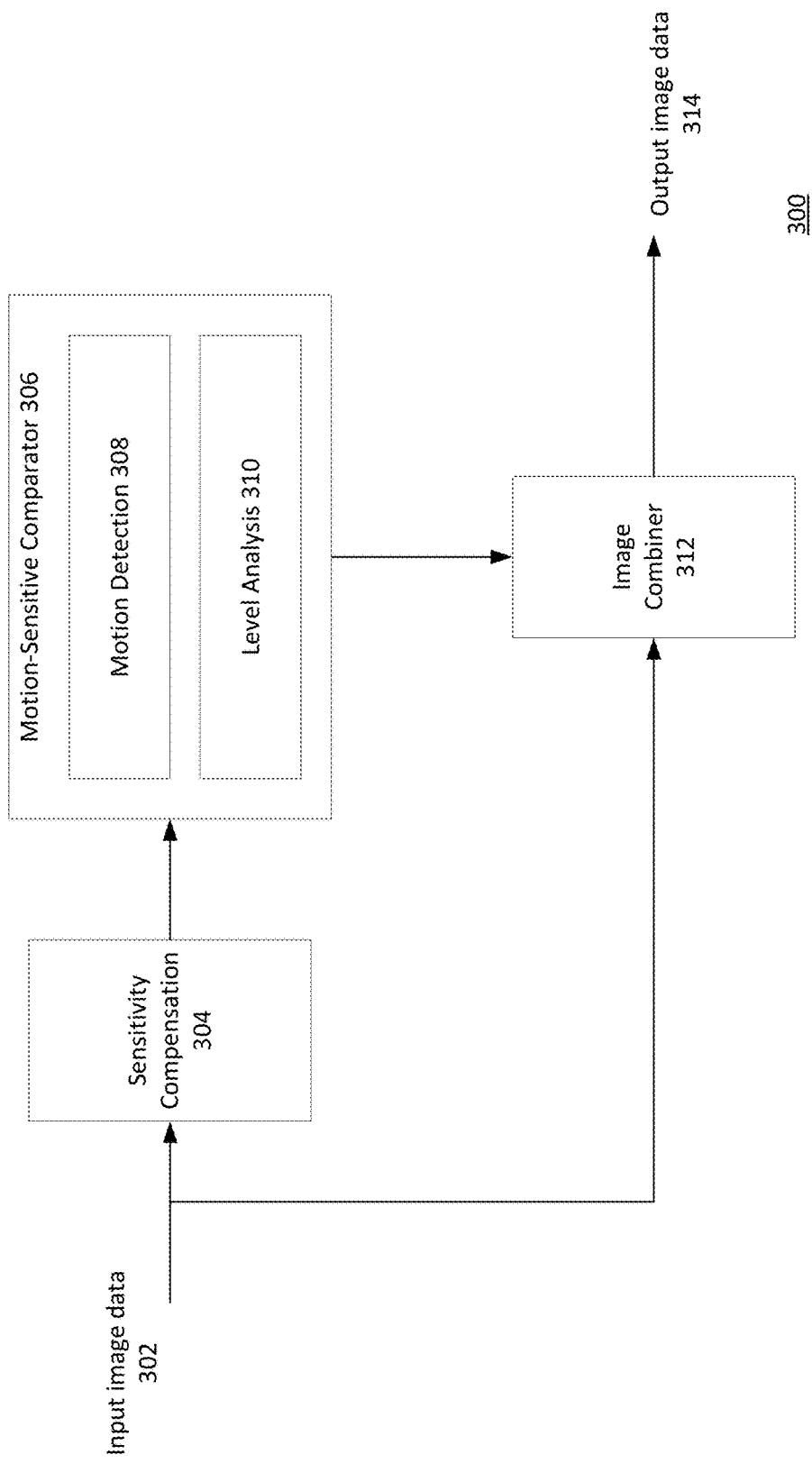
FIG. 3 illustrates a block diagram of a system for performing HDR imaging.

FIG. 3 illustrates a block diagram of a system for performing HDR imaging. In some embodiments, the HDR imaging is performed by the HDR imaging IC 216 as illustrated in FIG. 2. The system may be configured to receive input image data 302 comprising image data from a set of image frames. As used herein, a set of image frames may correspond to a plurality of images captured of the same scene but having different exposure levels.

In some embodiments, the system 300 may be implemented in hardware as a single-path system with limited memory. As such, image data from the set of image frames may be received as a bitstream and processed by the system as it is received. The system will only have access to a small portion of each image frame of the set of image frames at any given time, without the ability for the system to refer to other portions of the image frames.

In order to perform HDR imaging, the system analyzes the received image data to produce a single composite HDR image. For example, for portions of the image frame with high luminosity (e.g., due to direct sunlight), pixels from an image frame having lower exposure time may be used, because image frames having higher exposure times may be saturated in those portions of the image frame. On the other hand, for portions of the image frame with low luminosity (e.g., due to being in shadow), pixels from an image frame having higher exposure time may be used. As such, for each portion of the composite HDR image, appropriate image data from the set of image frames is selected, such that the composite HDR image is able to capture both high and low luminosity ranges while avoiding saturation (e.g., due to high exposure times) and unnecessary noise (e.g., due to low exposure time).

However, as discussed above, in scenes containing moving objects, ghosting or blurring may occur in the composite HDR image, due to the object appearing differently in different image frames having different exposure levels the set of image frames. As such, in order to perform motion-sensitive HDR imaging that reduces the amount of ghosting or blurring resulting from moving objects in the scene, the system 300 needs to be able to determine whether the received image data corresponds to a portion of the image frame where movement in occurring.

In order to determine whether the received image data corresponds to a portion of the image frame where movement is occurring, the system 300 may compare the image data from different image frames of the set of image frames. Because the image frames are captured at different exposure levels, in some embodiments, a sensitivity compensation circuit 304 is used to match the sensitivities of the received image data 302, such that the image data from different frames can be compared.

The sensitivity-compensated image data may be received by a motion-sensitive comparator 306. In some embodiments, the motion-sensitive comparator 306 comprises a motion detection circuit 308 and a level analysis circuit 310. The motion detection circuit 308 may be configured to compare image data from different frames of the set of frames in order to determine whether movement is occurring in the portion of the frame corresponding to the image data.

For example, in some embodiments, image data from adjacent pairs of image frames may be compared. If the difference between the image data of an adjacent pair exceeds a threshold value, it may be determined that movement is occurring in the corresponding portion of the image frame. As used herein, the term "adjacent pair" may be used to refer to a pair of images frames from the set of image frames that are next to each other when the set of image frames is sorted by exposure time. For example, a set of image frames may comprise a first image frame having a long exposure, a second image frame having a medium exposure, and a third image frame having a short exposure. As such, the set of image frames contains a first adjacent pair comprising the first and second image frames, and a second adjacent pair comprising the second and third image frames. In some embodiments, a particular pair of image frames may be compared to determine if movement is occurring. In other embodiments, multiple adjacent pairs may be compared. In some embodiments, image data from non-adjacent image frames may be compared.

The level analysis circuit 310 is configured to determine which image frame will be selected to form the corresponding portion of the composite HDR image. For example, in some embodiments, image data from the image frame of the set of image frames having the longest exposure time may be chosen if pixel intensity levels of the image data of the image frame satisfy one or more criteria. For example, in some embodiments, the criteria may be satisfied if a saturation level of the image data does not exceed a threshold value. If the image data is saturated, then image data from an image frame having lower exposure time may be selected. As such, each portion of the composite image frame may be selected from the image frame having the longest exposure time but with saturation below a threshold level.

In some embodiments, if it is determined that the image data corresponds to a portion of the image frame containing movement, in order to reduce blurring and/or ghosting, the selected image frame may be "demoted" such that an image frame having a lower exposure time will be selected. As a result, in portions of the image frame where movement is occurring, the image data that is selected will be associated with a lower exposure time than would have been otherwise if the portion had no motion. In other embodiments, if it is determined the image data contains movement, image data associated with a particular exposure time may be selected to form the composite HDR image, wherein the particular exposure time is based upon one or more determined characteristics of the movement (e.g., movement speed).

The selection from the motion sensitive comparator 306 (e.g., comprising the combined results from the motion detection circuit 308 and level analysis circuit 310) may be received by an image combiner 312, which selects the corresponding image data from the received input image data 302 to produce the output image data 314 corresponding to a portion of the composite HDR-processed image.

Figure 4:
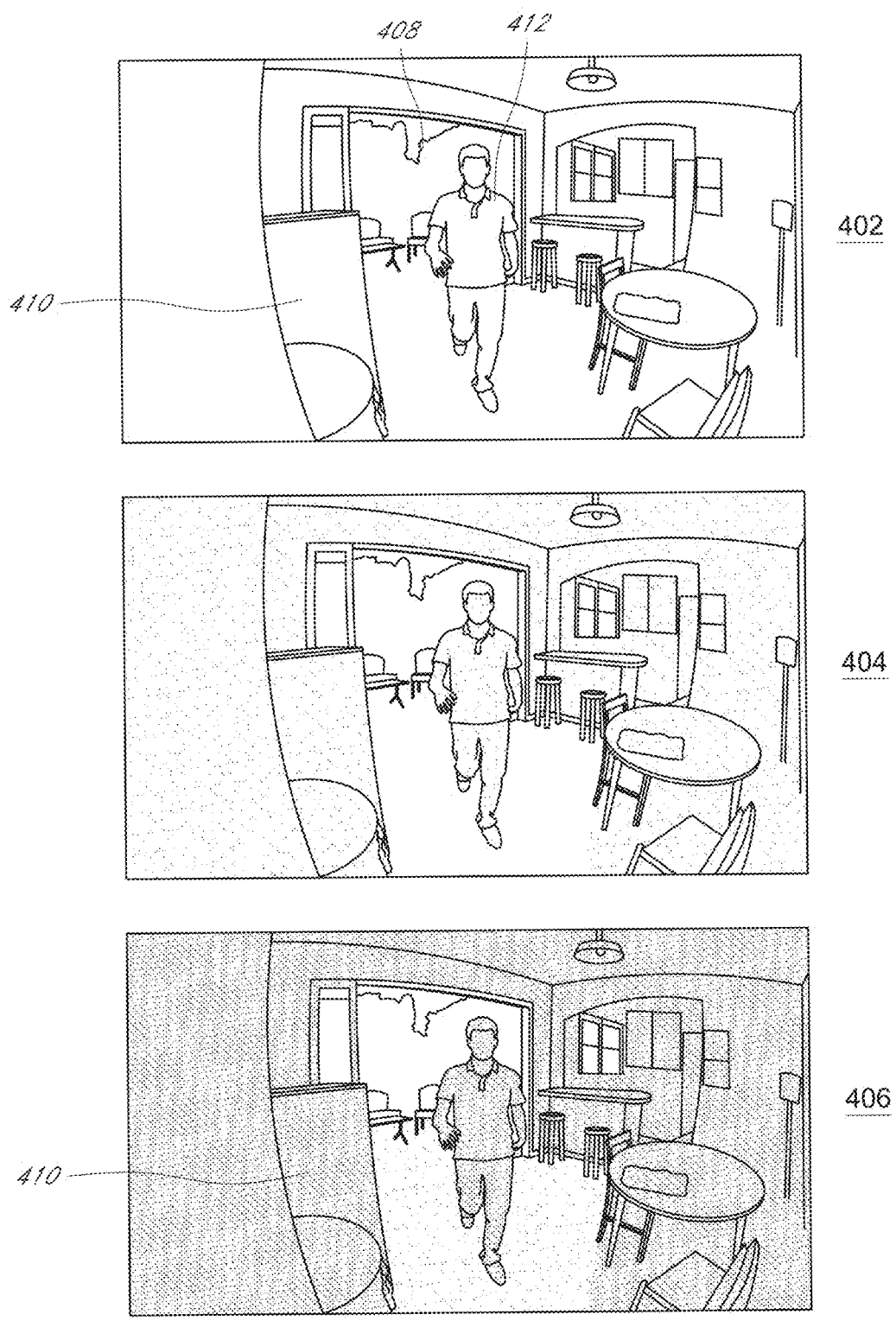
FIG. 4 illustrates a set of image frames captured of a scene that may be used in HDR imaging.

FIG. 4 illustrates a set of image frames captured of a scene that may be used in HDR imaging. The set of image frames comprises a first image frame 402 having a long exposure time, a second image frame 404 having a medium exposure time, and a third image frame 406 having a short exposure time. In some embodiments, the first image 402, due to having a longer exposure time, may appear saturated in high-luminosity areas such as area 408, but is clearer in low-luminosity areas, such as area 410. On the other hand, the second and third images 404 and 406, due to having shorter exposure times, may exhibit more noise in low-luminosity area 410, but may be unsaturated in high-luminosity area 408.

Figure 5B:
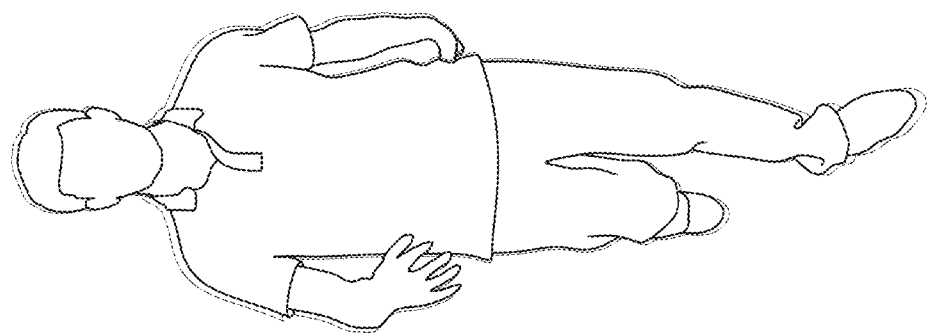
FIGS. 5A and 5B illustrates portions of a composite image that may result from performing HDR imaging using the set of image frames illustrated in FIG. 4, without and with motion-sensitivity implemented.
Figure 5A:
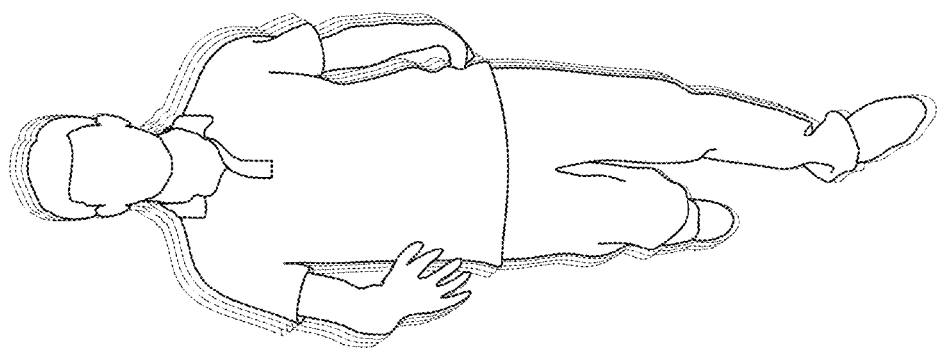

The set of image frames illustrated in FIG. 4 show a person 412 who is moving at the time the image frames were captured. FIG. 5A illustrates a portion of a composite image that may result from performing HDR imaging using the set of image frames illustrated in FIG. 4, using saturation analysis but without motion detection. Because the image of the person 412 is slightly different in each of the captured images illustrated in FIG. 4, blurring and ghosting appears in the image, especially in portions of the image frame with large differences in luminosity values (e.g., the border of the person). On the other hand, FIG. 5B illustrates a portion of a composite image that may result from performing HDR imaging using the set of image frames illustrated in FIG. 4, with motion-sensitivity implemented, which, as will be described in greater detail below, serves to select image data that will reduce the amount of blurring and/or ghosting caused by movement within the image frame.

Motion-Sensitive HDR System

Figure 6:
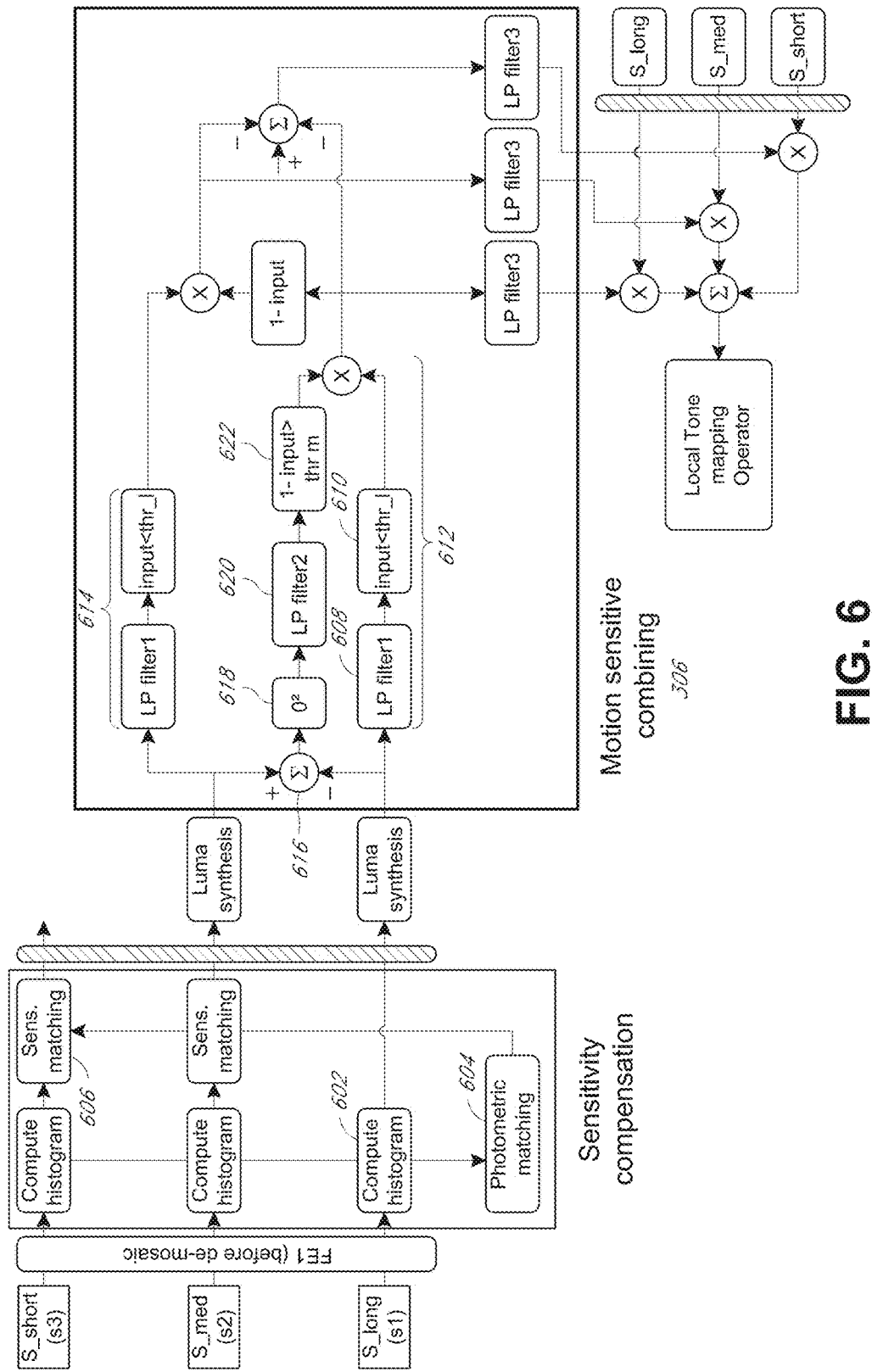
FIG. 6 illustrates a block diagram of a system for performing HDR imaging.

FIG. 6 illustrates a block diagram of a system for performing HDR imaging. In some embodiments, the system illustrated in FIG. 6 may be implemented on an integrated circuit (e.g., such as HDR imaging IC 216 illustrated in FIG. 2) or a system-on-chip.

In the illustrated embodiment, the set of image frames comprises three image frames: a first image S1 corresponding to a longest exposure time, a second image S2 corresponding to a medium exposure time, and a third image S3 corresponding to a shortest exposure time. It is understood that in other embodiments, the set of image frames may comprise a number of image frames other than three, each image frame of the set associated with a different exposure level, from a shortest exposure level to a longest exposure level.

As image data from the three image frames is received, sensitivity compensation may be formed at sensitivity compensation circuit 304. In some embodiments, this may comprise computing a histogram of the received image data (at 602), and performing photometric matching (604), and/or sensitivity matching (606) on the received image data. In some embodiments, sensitivity compensation is performed to allow for image data from different image frames of the set to be compared with each other, in order to identify if the image data corresponds to a portion of the image frame where movement is occurring (described in greater detail below). In some embodiments, one or more additional processing steps (e.g., luma synthesis producing weighted averages of R, G, and B values of a captured imaged frame) may be performed on the captured image data.

In some embodiments, after the received image data has undergone sensitivity matching, the image data may be received at the motion-sensitive combiner 306, which may be used to perform saturation analysis and/or motion detection using the received image data, each of which will be described in greater detail below.

Saturation Analysis

As discussed above, in some embodiments, choosing the image data to be used to form the composite HDR image may be done using a saturation analysis circuit. For example, as illustrated in FIG. 6, image data from S1 may be analyzed to determine whether it should be used in forming the corresponding portion of the composite HDR image. In some embodiments, the image data may first be passed through a filter (e.g., a low-pass filter 608) in order to reduce noise in the image data. The image data may then be compared with one or more saturation thresholds at a comparator 610, wherein the saturation thresholds indicate a tolerable level of saturation for the composite HDR image. In some embodiments, the image data may be compared with the one or more saturation thresholds on a per-pixel basis. In other embodiments, the image data may comprise one or more pixel groups.

In some embodiments, if it is determined that the image data does not exceed the one or more saturation thresholds, the image data may be used to form the composite HDR image. On the other hand, if the image data is determined to exceed the one or more saturation thresholds, image data from an image frame associated with a lower exposure time may be used (e.g., from S2 or S3).

Figure 7:
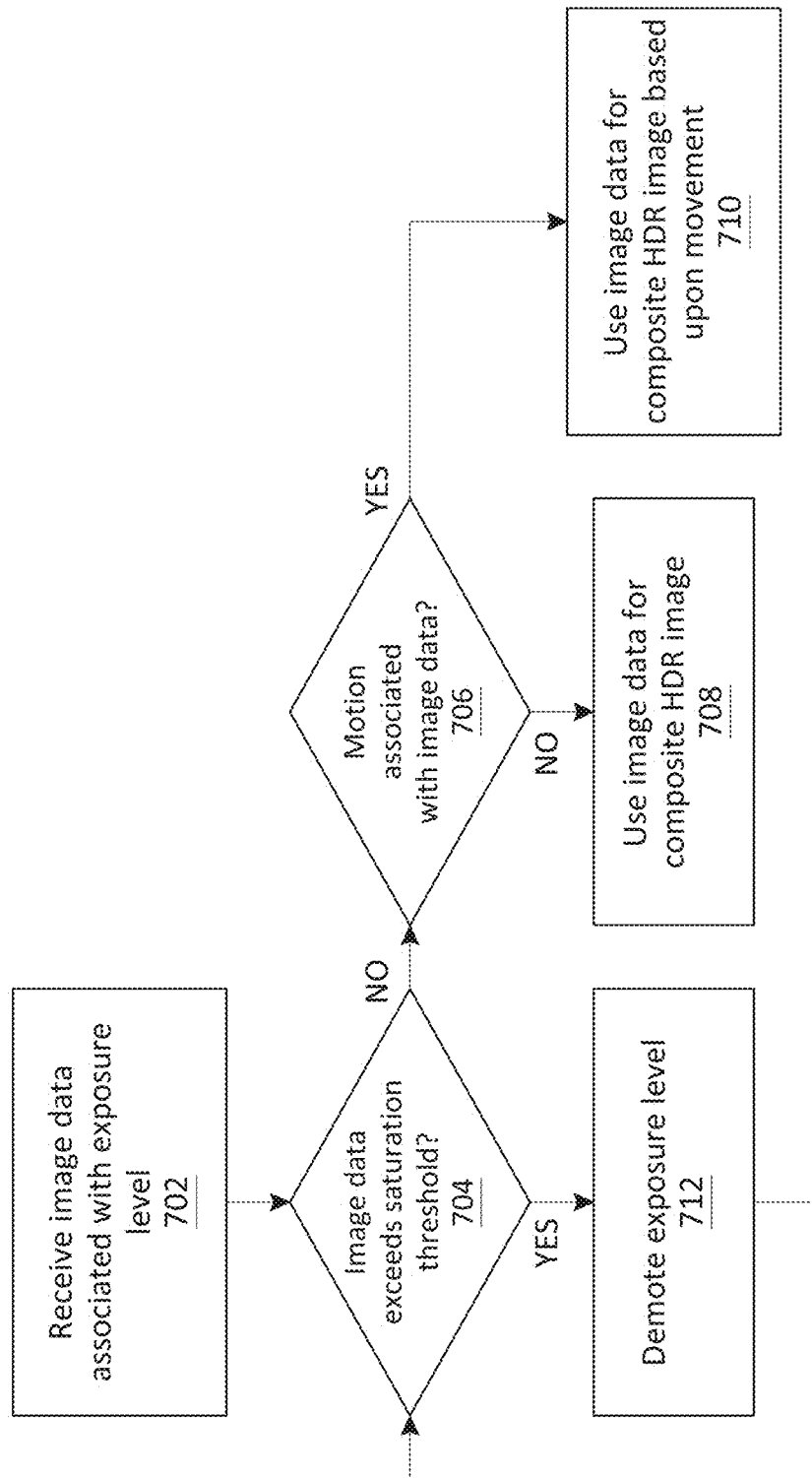
FIG. 7 illustrates a flowchart of an example process for performing saturation analysis in HDR imaging, in accordance with some embodiments.

FIG. 7 illustrates a flowchart of a process for performing saturation analysis in HDR imaging, in accordance with some embodiments. At block 702, image data from an image frame of the set of image frames may be received. In some embodiments, the image data may correspond to a portion of an image frame having a particular exposure level. In some embodiments, the initial image data received may correspond to a portion of an image frame of the set of image frames having a highest exposure level (e.g., S1 as illustrated in FIG. 6). In some embodiments, the received image data may be passed through one or more filters (e.g., a low-pass filter).

At block 704, a determination is made as to whether the received image data exceeds a saturation threshold. In some embodiments, each pixel of the received image data may be processed separately and compared to the one or more saturation thresholds. In other embodiments, groups or blocks of pixels may be processed together.

The one or more saturation thresholds may indicate a maximum saturation level that can be reached by the image data of the composite HDR image to be constructed. In some embodiments, the one or more saturation threshold values may be based upon the exposure level of the received image data. In other embodiments, the same saturation threshold values may be used regardless of the exposure level associated with the image data being processed.

If the image data does not exceed the saturation threshold, then at block 706, a determination may be made as to whether the portion of the image frame associated with the image data is associated with movement. If not, then at block 708, the image data may be used to form the composite HDR image. How motion is determined, as well its effects on which image data is selected for constructing the composite HDR image, is described in further detail below. If no movement is associated with the image data, then at block 708, the image data for constructing the composite HDR image is selected, based upon the saturation comparison. On the other hand, if it is determined that there is movement associated with the image data, image data for the composite HDR image may be selected based upon the detected movement (e.g., by demoting the exposure level of the image data, selecting image data having exposure time associated with a movement transition point, and/or the like), which will be further described below in association with FIGS. 8-10.

If it is determined that the luminosity values of the received image data exceeds the one or more saturation thresholds, then the image data may not be used in forming the composite HDR image. At block 712, the exposure level may be "demoted," such that image data from an image frame having a lower exposure level will be used to construct the composite HDR image. In some embodiments, the process may return to block 704, whereupon if it is determined that the image data associated with the demoted exposure time exceeds the saturation threshold. If not, then it may be determined whether there is movement associated with the image data (block 706).

For example, in the embodiment illustrated in FIG. 6, if the image data from the S1 frame does not exceed the one or more saturation thresholds, the S1 image data may be selected to construct the composite HDR image. On the other hand, if the S1 image data does exceed the saturation threshold, image data from the S2 frame may be selected instead. In some embodiments, if the S2 image data also exceeds the saturation threshold, image data from the S3 frame may be selected instead (not shown). As a result, each portion of the composite HDR image may be drawn from the image frame from the set of image frames having the highest exposure level while not exceeding a saturation threshold. In some embodiments, the image data used may be "demoted" between any two adjacent exposure pairs (e.g., from a longer exposure frame to a shorter exposure frame) based upon the image data of the longer exposure image frame satisfying one or more criteria (e.g., exceeding a saturation threshold).

In some embodiments, saturation analysis for received image data associated with each image frame of the set of image frames may be performed in parallel. For example, as illustrated in FIG. 6, image data from S1 may be analyzed along a first processing path 612, while image data from S2 may be analyzed along a second processing path 614. Note that in some embodiments there may be no need to perform saturation analysis on image data on an image frame having a lowest exposure time of the set of image frames (e.g., S3), as the exposure time cannot be demoted further.

Motion Detection

As discussed above, if the received image data corresponds to a portion of an image frame where movement is occurring, the image data used to construct the composite HDR image may be different from the image data that may be used in the absence of movement. This may be done in order to reduce the blurring and/or ghosting effects potentially caused by the movement. As such, it is necessary to be able to determine whether or not the image data being analyzed is associated with movement.

In the absence of movement within the image frame, image data from image frames having different exposure levels will typically be substantially identical after sensitivity compensation. However, movement in the image frame will cause the image data of the set of image frames corresponding to different exposure levels to differ. As such, image data associated with different image frame exposure times may be compared to determine the presence of movement in the image frame. For example, as illustrated in FIG. 6, image data from S1 and S2 (after sensitivity compensation) may be received and compared at a comparator 616 to produce difference data indicating a degree of difference between the image data. The difference data may then be compared against one or more threshold values. In some embodiments, the difference data may be then be modified (e.g., by a squarer 618 and/or a low-pass filter 620) prior to being compared against the one or more threshold values (e.g., at comparator 622), wherein the threshold value indicates a degree of difference between the compared image data above which it will be deemed that movement is present in the portion of the image frame corresponding to the image data. As such, if the difference data exceeds the one or more threshold values, then it may be determined that the image data corresponds to movement in the scenes. On the other hand, if the difference data does not meet the one or more threshold values, then it may be determined that the image data does not correspond to movement.

In response to a determination that the image data corresponds to movement in the scene, the exposure time of the image data selected to form the composite HDR image may "demoted" from the exposure time of the image that would have been used had no movement been detected (e.g., as determined through saturation analysis). For example, if S1 image data was to be used for forming the composite HDR image, the presence of movement in the image data may cause S2 image data to be used instead. Similarly, in some embodiments, if S2 image data was to be used for forming the composite HDR image, S3 image data may be used instead in response to a determination that movement is present in the image data.

In some embodiments wherein the set of image frames comprises more than two different exposure levels, image data from different adjacent pairs (e.g., S1 and S2, S2 and S3) may be compared to determine the presence of movement. For example, in some embodiments, the difference data from comparing a first adjacent pair may not exceed the threshold value, while the difference data from comparing a second different adjacent pair may exceed the threshold value. This may occur if a speed of movement is fast enough that the image data from both frames of an adjacent pair (e.g., the first adjacent pair) will be blurred to a degree such that they will be substantially identical. In some embodiments, the image data may be considered to contain movement if the difference data from comparing at least one adjacent pair exceeds the threshold value.

Figure 8A:
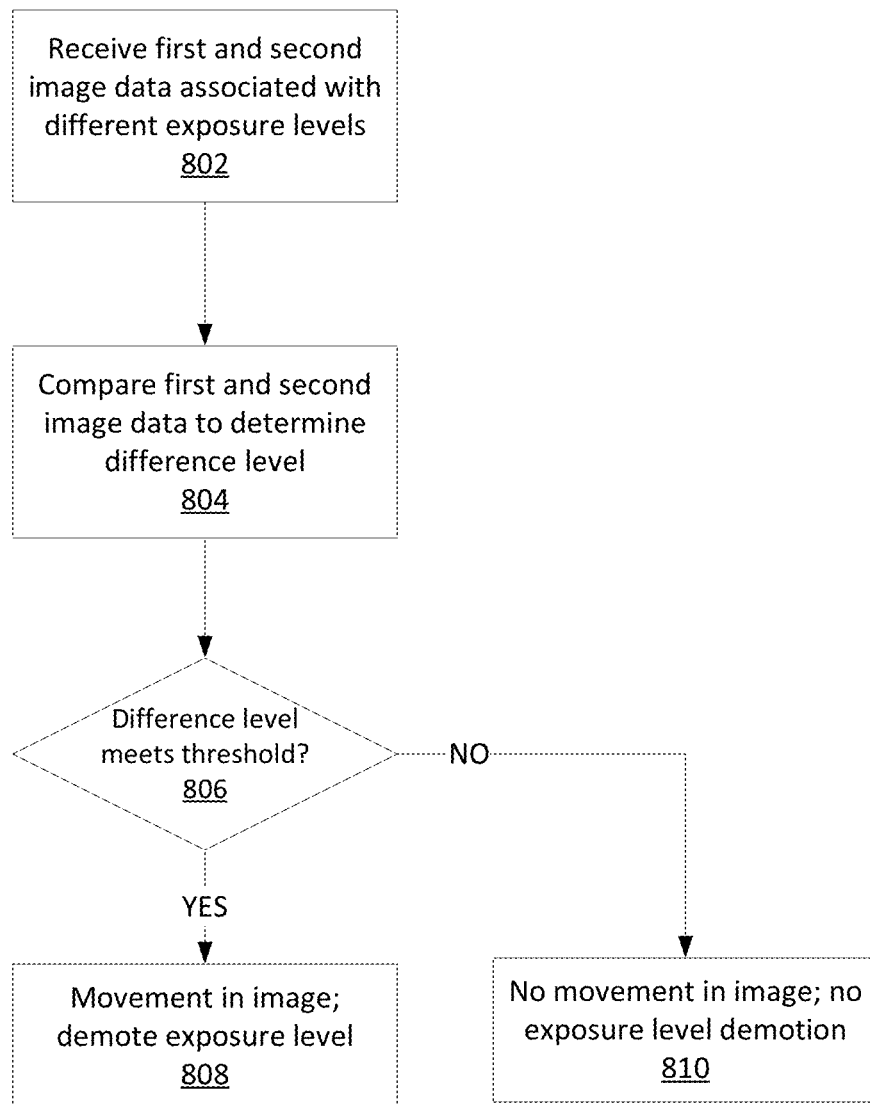
FIG. 8A illustrates a flowchart of an example process for detecting movement associated with the image data, in accordance with some embodiments.

FIG. 8A illustrates a flowchart of a process for detecting movement associated with the image data, in accordance with some embodiments. At block 802, image data associated with different exposure times is received. In some embodiments, the received image data comprises first image data associated with a first exposure time, and second image data associated with a second exposure time. In some embodiments, the first and second exposure times may be associated with an adjacent pair of the set of image frames. In some embodiments, sensitivity matching may be performed on the received image data, such that image data associated with different exposure times can be compared.

At block 804, the first and second image data are compared to determine a difference level between the first and second image data. In some embodiments, the comparison comprises subtracting the first image data from the second image data (or vice versa) to produce a set of difference data.

At block 806, a determination is made as to whether the degree of difference between the image data exceeds a threshold value. If so, then at block 808, it may be determined that the image data corresponds to movement in the image frame, and the exposure level to be used in constructing the composite HDR image will be demoted compared to the exposure level that would have been used in the absence of movement.

On the other hand, if the difference does not exceed the threshold, then it is determined that there is no movement, and the exposure time to be used to construct the composite HDR image (e.g., as determined through saturation analysis) will not be demoted.

While FIG. 8A illustrates determining the presence of movement in the image data by comparing a single pair of image data of different exposure levels, it is understood that in other embodiments, multiple pairs may be compared. In some embodiments, movement may be determined if at least one pair of compared image data has a difference that meets the threshold value. In some embodiments, movement is determined only if a certain number of pairs have a difference that meets the threshold value. In some embodiments, different pairs may be associated with different threshold values (e.g., based upon the exposure times associated with the pair).

Figure 8B:
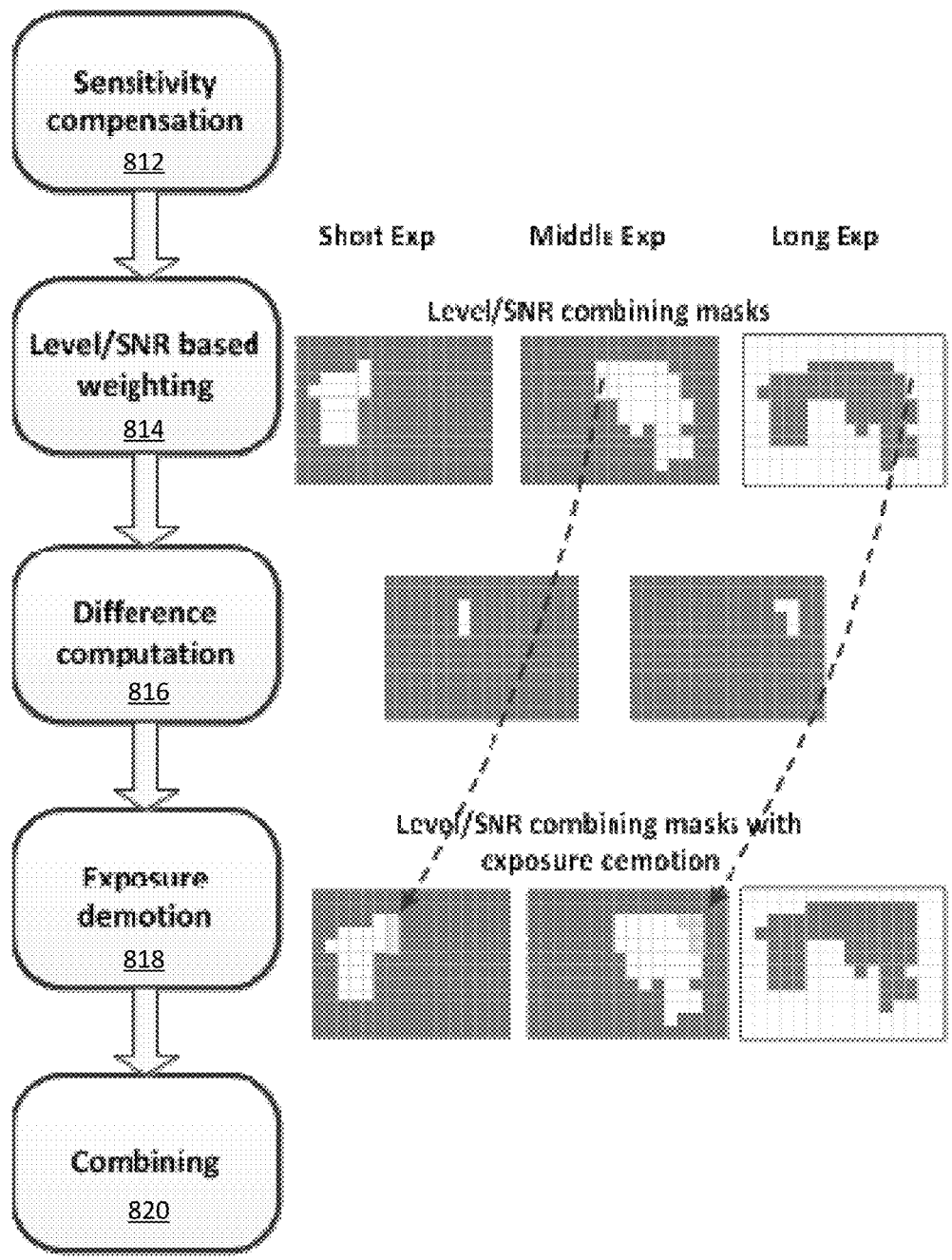
FIG. 8B illustrates a flowchart of a example process for constructing HDR images with motion-sensitive exposure demotion, in accordance with some embodiments.

FIG. 8B illustrates a flowchart of a process for constructing HDR images with motion-sensitive exposure demotion, in accordance with some embodiments. At block 812, sensitivity compensation may be performed on a plurality of frames having different exposure times (e.g., short, middle, and long exposures). This may be done so that image data from the different image frames can be compared with each other.

At block 814, saturation levels and signal-to-noise ratios (SNR) levels of the image frames may be analyzed and weighted in order to determine which portions of the HDR image may be constructed using data from which image frame. For example, as illustrated in FIG. 8B, each image frame may be associated with a mask specifying which portions of the image frame will be used to construct the HDR image (e.g., white portions), and which portions will not be (e.g., gray portions).

At block 816, difference computation may be performed between one or more of the received image frames, in order to identify areas in the image where motion is occurring. For example, in some embodiments, each image frame may be compared to the image frame having the next shortest exposure time (e.g., long exposure frame compared with middle exposure frame, middle exposure frame compared to short exposure frame) to determine which portions of the frame may be associated with motion and may need to be demoted.

At block 818, exposure demotion is performed based upon the difference computations. For example, in the illustrated embodiment, areas of the image that would have used the long exposure frame found to have motion (as determined by the difference computation) may be demoted to use the middle exposure frame. On the other hand, areas of the image that would have used the middle exposure frame found to have motion may be demoted to use the short exposure frame. At block 820, the HDR image is constructed by combining the data from the different exposure frames, based upon the level/SNR based weighting and exposure demotion.

Motion Transition Point

In some embodiments, for an HDR imaging system having a large number of different exposure levels (e.g., greater than 2), the presence of movement in the image frame may be determined through comparing a plurality of adjacent pairs of the set of image frames. As discussed above, image data associated with certain adjacent pairs may not exhibit a difference exceeding a threshold even when there is movement in the image frame. For example, movement may cause blurring in image data associated with higher exposure times, such that adjacent pairs of image data associated with high exposure times may be substantially identical due to the blur. On the other hand, adjacent pairs of image data associated with lower exposure times may also be substantially identical, as the exposure times are too long to capture the movement. However, the image data associated with lower exposure times may be noisy.

Figure 9:
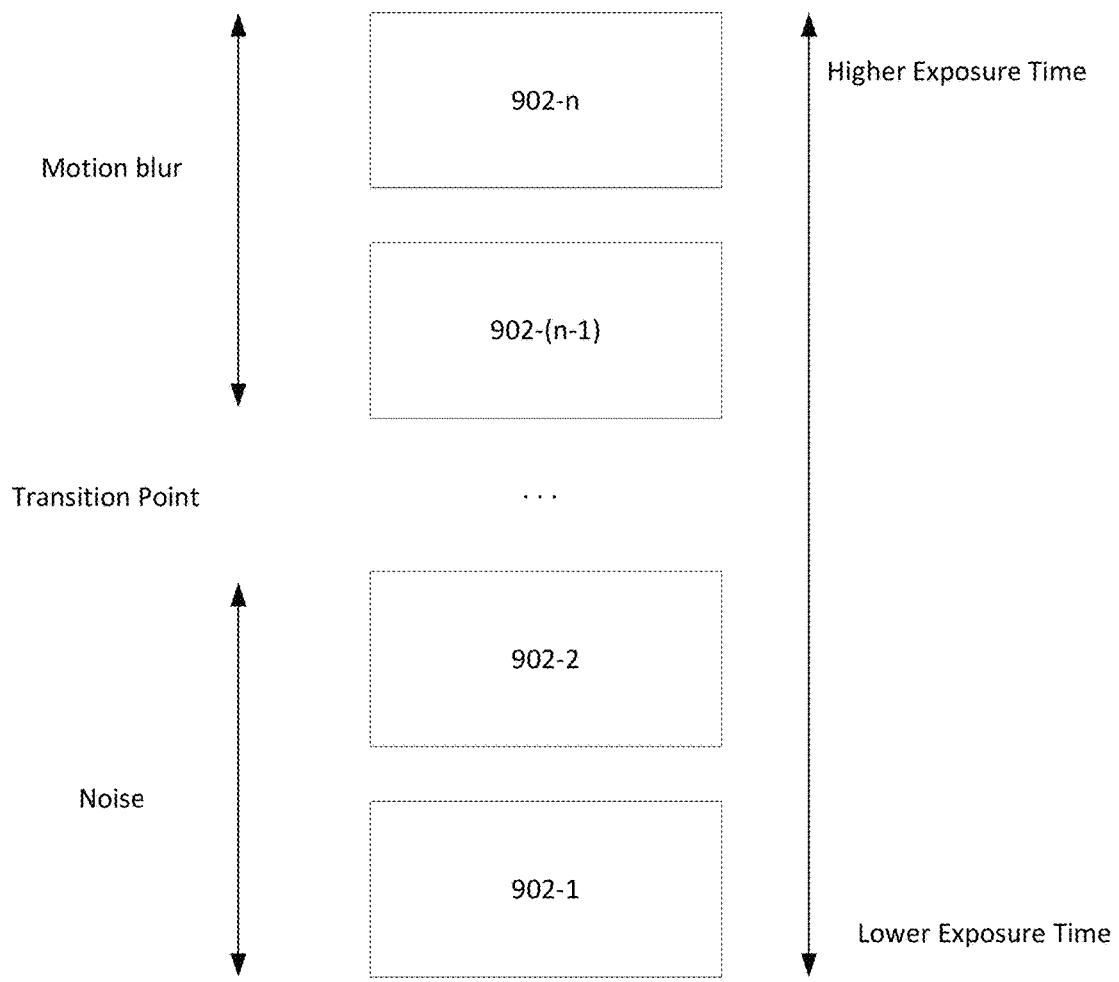
FIG. 9 illustrates how movement may be detected in image data for different image frames associated with different exposure times.

FIG. 9 illustrates how movement may be detected in image data for different image frames associated with different exposure times. As illustrated in FIG. 9, the set of image frames may comprise a large number of image frames 902-1 through 902-n having different exposure times from a lowest exposure time to a highest exposure time. In some embodiments, in portions of the image data corresponding to movement, the movement may cause blurring in image frames having higher exposure times. As such, the difference factor of image data from adjacent pairs of image frames having high exposure times (e.g., image frames 902-n and 902-(n−1)) may not exceed a threshold value even when there is movement, due to the image data for both image frames exhibiting motion blur.

On the other hand, image data from image frames having lower exposure times may not exhibit motion blur. However, in general, the lower the exposure time, the noisier the image data will be. In some embodiments, even if there is movement in the image frame, the image data from adjacent pairs of image frames having low exposure times (e.g., image frames 902-1 and 902-2) may be substantially identical due to noise, the difference factor between the image data not exceeding the threshold value.

In some embodiments, image data from each adjacent pair of image frames of the set of image frames may be compared in order to locate a "transition point." The transition point may correspond to an adjacent pair of the set of image frames where motion blur begins to appear in the image data associated with the higher exposure time of the adjacent pair, such that the difference factor of the image data will exceed the threshold value. In some embodiments, the "transition point" is associated with a particular exposure time. For example, the exposure time associated with the transition point may correspond to the lower exposure time of the adjacent pair associated with the transition point (e.g., due to exhibiting less blur). In some embodiments where image data associated with more than one adjacent pair may have a difference exceeding the threshold value, the transition point may be associated with a particular adjacent pair of the more than one than one adjacent pair (e.g., the adjacent pair associated with the lowest exposure time of the more than one adjacent pair).

In some embodiments, the exposure time associated with a transition point may be based upon a speed of the movement. For example, faster movement will typically cause a greater amount of blur in comparison to slower movement, resulting in more blur being exhibited by image data associated with lower exposure times. As such, the transition point may be associated with a lower exposure time for faster movement, and a higher exposure time for slower movement.

In some embodiments, instead of "demoting" exposure level in response to movement being detected (e.g., as described above), image data associated with the exposure time of the transition point may be selected for constructing the composite HDR image when movement is detected. For example, if it is determined that the received image data is associated with movement, the image data associated with the exposure time of the transition point may be selected regardless of the image data that would have been selected in the absence of motion (e.g., using saturation analysis). By selecting image data based upon the transition point, the amount of blur (e.g., present at higher exposure levels) and noise (e.g., present at lower exposure levels) in the composite HDR image may be reduced. In addition, by identifying a transition point, the most suitable image data for different speeds of movement may be selected. In some embodiments, if the image data that would have been selected in the absence of motion (e.g., using saturation analysis) is associated with an exposure time lower than that of the transition point, the selection may remain unchanged. In some embodiments, if the selected image data has an exposure time lower than the transition point, the selection may be "demoted" to the next lowest exposure time.

Figure 10:
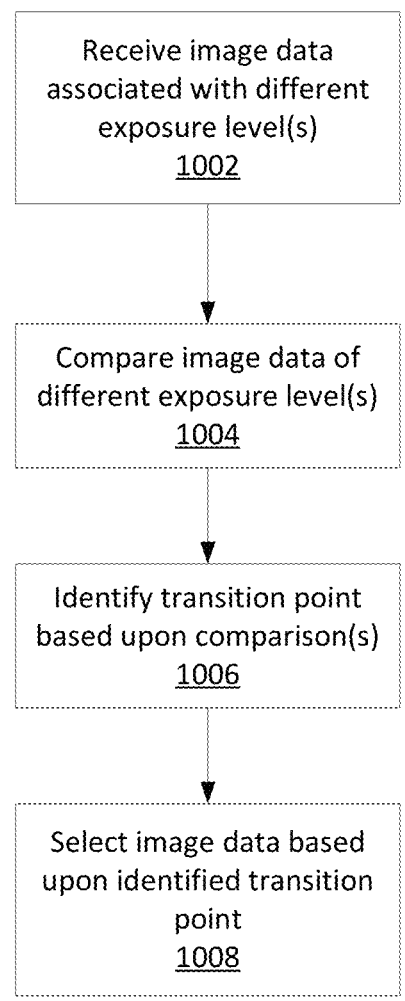
FIG. 10 illustrates a flowchart of a process of performing motion-sensitive HDR imaging.

FIG. 10 illustrates a flowchart of a process of performing motion-sensitive HDR imaging. At block 1002, image data associated with different exposure levels is received. At block 1004, image data of different exposure levels is compared. In some embodiments, image data from each adjacent pair of exposure levels may be compared. In some embodiments, the comparison comprises subtracting a first image data from a second image data to determine difference data.

At block 1006, a transition point is identified based upon the compared image data. In some embodiments, the transition point corresponds to a pair of compared image data wherein the difference between the image data exceeds a threshold value. In some embodiments, an exposure time may be associated with the transition point (e.g., the lower exposure time of the pair of compared image data).

At block 1008, image data for constructing a composite HDR image is selected, based upon the identified transition point. For example, the image data may correspond to the exposure time associated with the transition point.

Other Considerations

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described in the figures. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

A person having ordinary skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. An apparatus for performing high dynamic range (HDR) image processing, the apparatus comprising a processor, in connection with a memory, configured to:
   determine a selection of a received set of image data that is below a saturation threshold value;
   in response to determining the selection, compare a difference factor for one or more pairs of the set of image data with a difference threshold, wherein each of the one or more pairs are associated with sequentially adjacent exposure times;
   in response to determining that the difference factor exceeds the difference threshold for the one or more pairs, determine that the set of image data is associated with movement;
   change the selection of the image data in response to determining that the set of image data is associated with movement; and
   construct an HDR image according to the changed selection of the image data.

2. The apparatus of claim 1, further configured to perform sensitivity matching between the one or more pairs associated with sequentially adjacent exposure times.

3. The apparatus of claim 1, further configured to perform saturation analysis on the received set of image data in association with at least a subset of a plurality of different exposure times in parallel.

4. The apparatus of claim 1, further configured to, in response to determining that the set of image data is associated with movement, identify an exposure time associated with the movement based upon exposure times associated with the one or more pairs.

5. The apparatus of claim 4, further configured to change the selection of the image data to specify an image data associated with the identified exposure time.

6. The apparatus of claim 4, further configured to not change the selection if the exposure time associated with the one or more pairs is lower than the identified exposure time.

7. The apparatus of claim 1, further configured to change the selection of the image data to specify an image data associated with an exposure time lower than that of the selection.

8. The apparatus of claim 7, further configured to change the selection of the image data to specify an image data having an exposure time sequentially adjacent to the selection.

9. The apparatus of claim 1, wherein the difference factor for the one or more pairs is based upon a calculated difference in pixel intensity values of the image data for the one or more pairs.

10. The apparatus of claim 9, wherein determining the difference factor comprises filtering the calculated difference in pixel intensity values using a low pass filter.

11. A method for performing high dynamic range (HDR) image processing, comprising:
    determining a selection of a received set of image data that is below a saturation threshold value;
    in response to determining the selection, comparing a difference factor for one or more pairs of the set of image data with a difference threshold, wherein each of the one or more pairs are associated with sequentially adjacent exposure times;
    in response to determining that the difference factor exceeds the difference threshold for the one or more pairs, determining that the set of image data is associated with movement;
    changing the selection of the image data in response to determining that the set of image data is associated with movement; and
    constructing an HDR image according to the changed selection of the image data.

12. The method of claim 11, further comprising performing sensitivity matching between the one or more pairs associated with sequentially adjacent exposure times.

13. The method of claim 11, further comprising performing saturation analysis on the received set of image data in association with at least a subset of a plurality of different exposure times in parallel.

14. The method of claim 11, further comprising, in response to determining that the set of image data is associated with movement, identifying an exposure time associated with the movement based upon exposure times associated with one or more pairs.

15. The method of claim 14, further comprising changing the selection of the image data to specify an image data associated with the identified exposure time.

16. The method of claim 14, further comprising not changing the selection if the exposure time associated with the one or more pairs is lower than the identified exposure time.

17. The method of claim 11, further comprising changing the selection of the image data to specify an image data associated with an exposure time lower than that of the selection.

18. The method of claim 17, further comprising changing the selection of the image data to specify an image data having an exposure time sequentially adjacent to the selection.

19. The method of claim 11, wherein the difference factor for the one or more pairs is based upon a calculated difference in pixel intensity values of the image data for the one or more pairs.

20. The method of claim 19, wherein determining the difference factor comprises filtering the calculated difference in pixel intensity values using a low pass filter.

* * * * *